Aug. 16, 1927.  1,639,564

F. HUBER

DISPENSING APPARATUS

Filed July 7, 1926  4 Sheets-Sheet 1

Frank Huber, INVENTOR.

BY

Geo. F. Kimmel, ATTORNEY.

Aug. 16, 1927.

F. HUBER 1,639,564

DISPENSING APPARATUS

Filed July 7, 1926

Frank Huber, INVENTOR.

BY

Geo. P. Kimmel ATTORNEY.

Frank Huber, INVENTOR.

BY

Geo. P. Kimmel, ATTORNEY.

Aug. 16, 1927.
F. HUBER
1,639,564
DISPENSING APPARATUS
Filed July 7, 1926
4 Sheets-Sheet 4
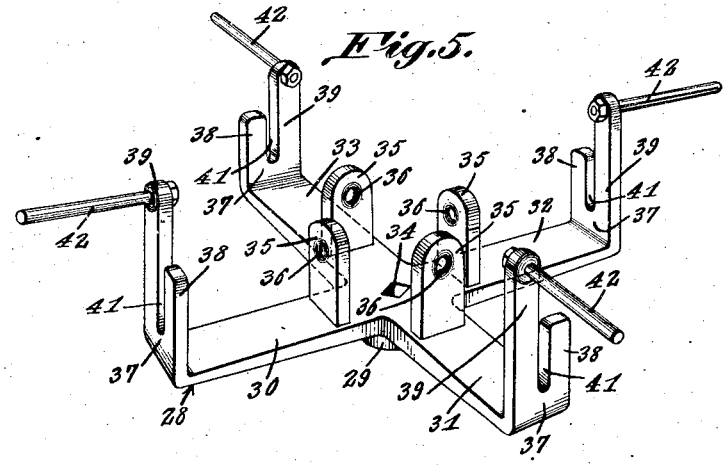
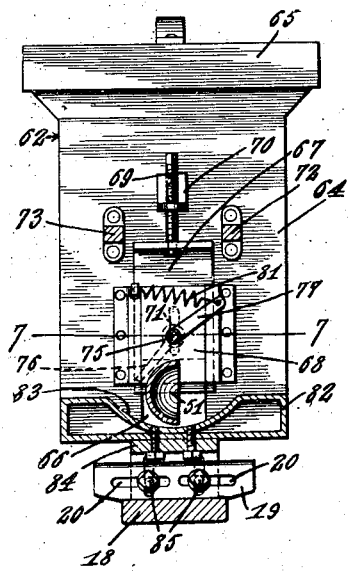
Frank Huber, INVENTOR.
BY
Geo. P. Kimmel ATTORNEY.

Patented Aug. 16, 1927.

1,639,564

UNITED STATES PATENT OFFICE.

FRANK HUBER, OF MIDDLETOWN, INDIANA.

DISPENSING APPARATUS.

Application filed July 7, 1926. Serial No. 120,992.

This invention relates to a dispensing apparatus designed primarily for the supplying of salt for seasoning or preservative purposes to receptacles or cans containing or adapted to contain articles of food, but it is to be understood that an apparatus in accordance with this invention can be employed for any purposes for which it is found applicable, and the invention has for its object to provide, in a manner as hereinafter set forth, an apparatus of the class referred to, for supplying a body of salt into an open top receptacle or can containing or adapted to contain an article of food as the receptacle or can is conducted by a conveyor to a can lid applying mechanism or to a can filling mechanism.

A further object of the invention is to provide, in a manner as hereinafter set forth, a dispensing apparatus for the purpose referred to, intermittently operated by and during the travel of receptacles or cans towards a lid applying or filling mechanism for the cans.

Further objects of the invention are to provide, in a manner as hereinafter set forth, a dispensing apparatus which is simple in its construction and arrangement, strong, durable, compact, thoroughly efficient in its use, operated by the receptacles to which the salt is supplied, readily assembled, and comparatively inexpensive to set up.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 5 is a perspective view of the combined carrier and trip element.

Figure 6 is a section on line 6—6 Figure 2.

Figure 7 is a section on line 7—7 Figure 6.

Figure 1:
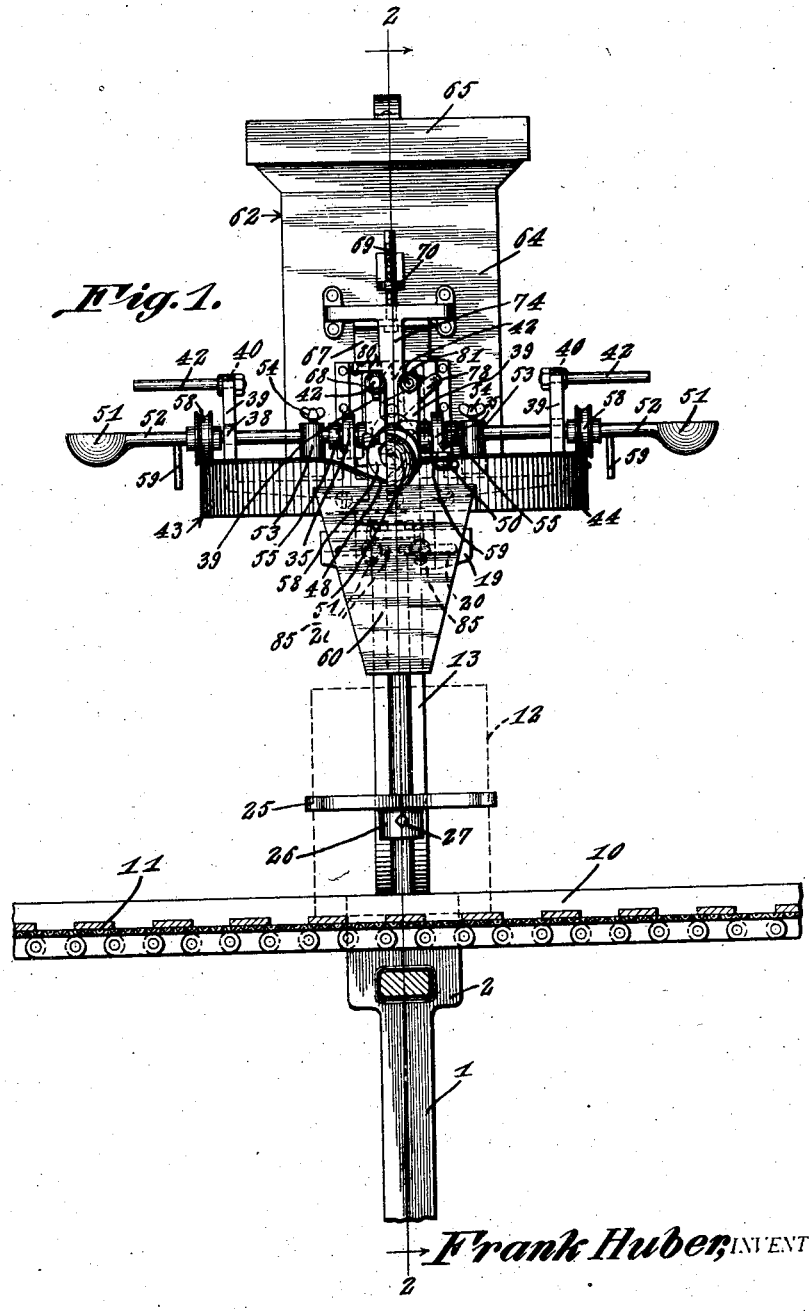
Figure 1 is a front elevation of a dispensing apparatus in accordance with this invention.

Referring to the drawings in detail 1 denotes a standard provided with a head 2 of rectangular contour and formed integral with the latter and extending at right angles with respect thereto is a laterally disposed arm 3 formed at its outer end with a vertical extension 4 rabbeted as at 5 to provide a seat 6. That face of the head 2 which opposes the inner face of the extension 4 is rabbeted as at 7 to provide a seat 8. Mounted on the seats 6 and 8 are a pair of oppositely disposed conveyor supports 9, 10 respectively. Travelling upon the supports 9, 10 is a conveyor 11 for the cans or receptacles 12 to which is adapted to be supplied a body salt in a manner as hereinafter referred to. The conveyor 11 is operated by any suitable means, not shown, and conveys the cans in position to have a body of salt supplied thereto, and is further adapted to convey the cans to a filling or lid applying mechanism therefor not shown. As the cans 12 are transported by the conveyor 11 they are adapted to intermittently operate the dispensing apparatus, in accordance with this invention, so that the apparatus will take up a body of salt from a source of supply and dump the same into a can 12.

Secured to that face of the head 2, which is not rabbeted, is an upstanding support comprising a vertically disposed arm 13 which at its lower end merges into a horizontally disposed arm 14 provided with oppositely extending flanges 15. The arm 14 projects towards the head 2 and the flanges 15 are fixedly secured to the head 2, by the hold fast devices 16. The arm 13 at its upper end terminates in a circular shallow container 17 which is positioned over the arm 14, head 2 and arm 3 and spaced a substantial distance thereabove. The arm 13 at a point a substantial distance below the container 17 is formed with a right angularly disposed extension 18 projecting in an opposite direction with respect to the arm 14 and having its free end formed with a vertically disposed flange 19 formed with a pair of spaced lengthwise extending slots 20. The bottom of the container 14 is formed with an axially arranged opening 21 for the passage of the operating shaft 22 of the apparatus. The shaft 22 extends into the container 17 and has a polygonal shaped upper terminal portion 23. The shaft 22 has a reduced cylindrical lower portion 24 which is journaled in a socket 25' formed in the upper face of the arm 14 in proximity to the head 2. Fixedly secured to the shaft 22, a substantial distance above the arm 14, is a star wheel 25 provided with a collar 26, through which extends a set screw 27 whereby the star wheel 25 is fixedly secured to the shaft 22.

The star wheel 25 extends over the conveyor 11 and in the path of the cans 12, so that during the transporting of the latter, each can will successively engage the star wheel 25 and imparts the same a quarter turn.

On the actuation of the star wheel 25 the shaft 22 will have imparted thereto one quarter of a revolution. As illustrated the star wheel 25 is constructed so that it will require four impulses from four cans to provide for one complete revolution of the shaft 22 and this arrangement is had in view of the fact that the apparatus is set up with four combined salt dippers or dispensers. If the number of salt dippers or dispensers was increased or diminished the star wheel 25 would be constructed accordingly or rather have its points or arms correspond to the number of salt dippers or dispensers.

Mounted on the polygonal shaped upper terminal portion 23, of the shaft 22 and arranged within, as well as projecting above the container 17, is a combined carrier and trip element 28, best shown in Figure 5. The element 28 is formed with a depending hub 29 which rides upon the upper face of the bottom of the container 17 and the shaft 22 carries a hold fast device 30' which engages the upper face of the element 28 and couples the same with the shaft 22 whereby on the operation of the latter the element 28 will be carried therewith.

The combined carrier and trip element includes four radially extending equi-distant arms 30, 31, 32 and 33 which are formed integral at their inner ends with the hub 29. A polygonal shaped opening 34 is provided in the hub 29 and which corresponds in contour to the shape of the polygonal upper terminal portion 23 of the shaft 22. Formed integral with the upper face of each of the arms of the element 28 is a vertically disposed lug 35 provided at its upper end with an opening 36. The lugs carried by the arms 32 and 30 oppose each other and the lugs carried by the arms 31 and 33 oppose each other. The outer end of each of the arms of the element 28 has formed integral therewith a vertically disposed projection 37 which is bifurcated to form a pair of spaced arms 38, 39 and with the latter of greater height than the former and provided at its upper end with an opening 40. The space between each pair of arms 38, 39 is indicated at 41 and the bottom of the space is positioned a substantial distance above the lower end of a projection 37. The pair of arms at the outer end of the arm 30 oppose and are oppositely disposed with respect to the pair of arms carried by the outer end of the arm 32 and the pair of arms carried at the outer end of the arm 31 are oppositely disposed with respect to the pair of arms carried by the outer end of the arm 33. The openings 36 arranged in the lugs 35 oppose the spaces 41 between the pairs of arms at the outer ends of the arms 30, 31, 32 and 33. Fixedly secured to each arm 39 is an outwardly extending trip bar 42.

Fixedly secured within the container 17, projecting a substantial distance thereabove and surrounding the element 28 is a combined guide and trip element referred to generally by the reference character 43. The element 43 consists of a circular band 44 having its top edge 45 forming a track. Openings 46 are provided in the band 44 for the passage of hold fast devices to fixedly secure the same to the container 17. The upper portion of the band 44 at diametrically opposite points is cut away to form a semi-circular depression 47 and a semi-pear shaped depression 48. The depressions 47 and 48 are so shaped to provide for the turning, in a manner as hereinafter referred to of the dippers or dispensers. Fixedly secured to and projecting laterally from the band 44 is a pair of trip pins 49, 50. The function of said pins will be presently referred to. The pin 49 is positioned forwardly of the depression 47 with respect to the travel of the dippers or dispensers and a like arrangement is had of the pin 50 with respect to the depression 48. The pins 49 and 50 extend over the top of the container 17. The band 44 in connection with the depressions 47 and 48 and pins 49 and 50 provides means for guiding the dippers and dispensers so that these latter will take up a body of salt from a source of supply and dump the same into the cans 12.

As illustrated four dippers or dispensers are employed in the apparatus and as the construction of each dipper is the same, but one will be described, as the description of one will apply to the others. Each dipper consists of a semi-circular cup 51 having projecting from the inner side thereof a shank 52 of appropriate length and which is of cylindrical contour. The shank or stem 52 in proximity to its inner end carries a counterweight 53 which is adjustably secured to its respective shank or stem by a set screw 54 engaging in one end of the weight and binding against the stem or shank. The weight 53 is eccentrically mounted on the stem or shank, see Figure 3. The inner terminal portion of the stem or shank 52 is provided with a pair of spaced bosses or collars 55, 56 arranged in opposed relation and having the opposed faces thereof beveled as at 57. The collar 56 is detachably connected to the stem or shank. Carried by the stem or shank 52 is a grooved pulley 58 which travels on the edge 45 of the band 44. The stem or shank 52 in proximity to the pulley 58 but outwardly with respect thereto is provided with a trip pin 59, which normally depends from the shank or stem in a manner as shown in Figure 1. The pins 59 associate with the pins 49 and 50 for the purpose of turning the dipper to salt receiving position and to salt dumping position. The stem or shank 52 extends through an opening 36 in the lug 35 and the collar 56 is arranged rearwardly of the lug. The collar 55 is arranged forwardly of the lug. The weight 53 is positioned outwardly with respect to the collar 55. The stem or shank 52 extends through a space 41 and the pair of arms 38, 39 provide means for preventing the stem or shank 52 from shifting off a radial arm of the carrier 28.

When the shaft 22 is actuated, by the star wheel 25, the carrier 28 will be carried therewith and the pairs of arms 38 and 39 will provide for the bodily moving of the shanks or stems 52 of the dippers with the carrier 28. When the pulleys 48 travel in the depression 47 the cups 51 will be shifted to a position to take up the salt from a source of supply or in other words the shape of the depression 47 is such as to provide a dipping movement for the cup as it passes through the supply of salt whereby the cup will take up the salt from the supply. When the pulleys 58 travel through the depression 48, the same will provide for an abrupt turn of the cups 51 for the purpose of discharging the salt therefrom into the cans 12.

Figure 2:
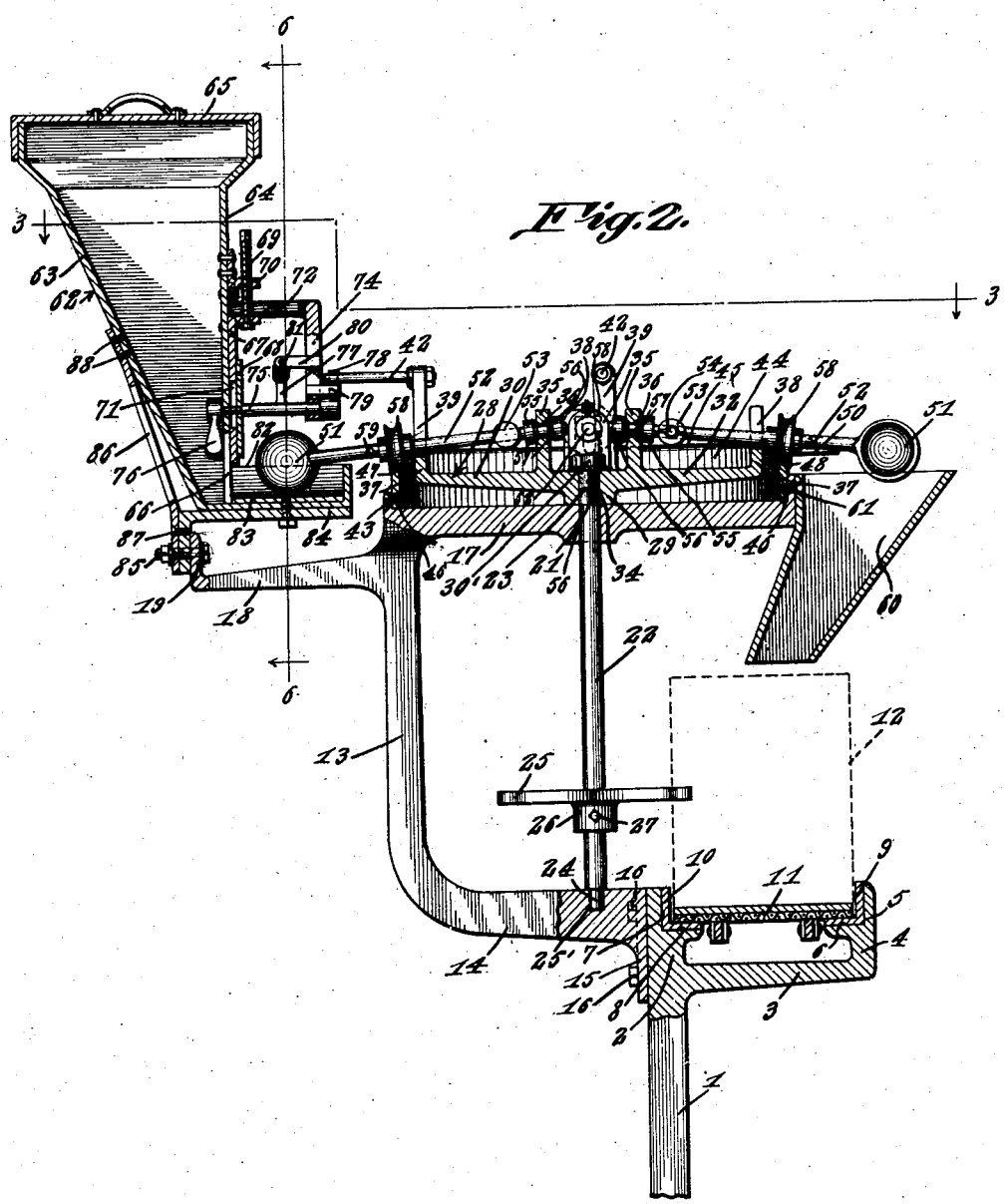
Figure 2 is a section on line 2—2, Figure 1.

Secured to the outer face of the container 17 as well as depending therefrom, is a conducting chute 60 which is positioned over a top of a can 12 and provides means when the salt is dumped from the cups 51 to be conducted into the open top of the cans, see Figure 2. The chute 60 is secured to the container 17 and element 43 by hold fast devices 61, see Figure 2. The chute 60 is arranged at one side of the apparatus opposite that side at which is positioned the source of supply for the salt. Arranged over the arm 18 is a receptacle, referred to generally by the reference character 62 for the supply of salt. The receptacle 62 comprises a tapered body portion 63 formed with a vertically disposed inner wall 64. A removable cover 65 is provided for the top of the body portion 62. The lower end of the wall 64 is formed with an outlet opening 66 closed by a vertically adjustable gate 67 which slides through a keeper 68 and is connected at its upper end to an adjusting screw 69 having threaded engagement with a keeper 70 secured to the wall 64. The gate 67 is formed with a vertically disposed, centrally arranged lengthwise extending slot 71. Connected to the wall 64 and projecting therefrom is a pair of arms 72, 73 which have formed integral therewith a depending hanger 74. Journaled in the hanger 74 is an agitator shaft 75 which extends through the keeper 68, slot 71 and also through the wall 64 into the body portion 63 and carries on its inner end an agitator 76. The shaft 75 is provided with a pair of crank arms 77, 78. The arm 77 is interposed between the hanger 74 and the wall 64 of the body portion 63 and the crank 78 is arranged at the outer end of the shaft 75. The hanger 74 carries a stop 79 for limiting the movement in one direction of the crank 78. The hanger 74 carries a lug 80 to which is attached a controlling spring 81 for the crank arm 77. The spring 81 is connected to the outer end of the crank arm 77, see Figure 6. The agitator 76 is positioned in proximity to the outlet 66 see Figure 2. The lower end of the body portion 62 has projecting therefrom and in a direction towards the container 77 an extension 82 provided in its top with a concavity 83 for receiving the salt from the outlet 66 and through said concavity 83 travels a cup 51 when taking up the salt from the source of supply. The lower end of the body portion 63 and the extension 62 is mounted upon an angle shaped supporting member 84 which is fixedly secured to the flange 19 by the hold fast devices 85 which extend through the slots 20. Secured to the member 84 and also to the body portion 63 is an upstanding and outwardly inclined brace member 86. The hold fast devices 85 connect the lower end of the brace member 86 with the extension 19 and hold fast devices 87 are employed for connecting the brace member 86 to the supporting member 84. Hold fast devices 88 are employed for securing the brace member 86 to the body portion 63.

Figure 3:
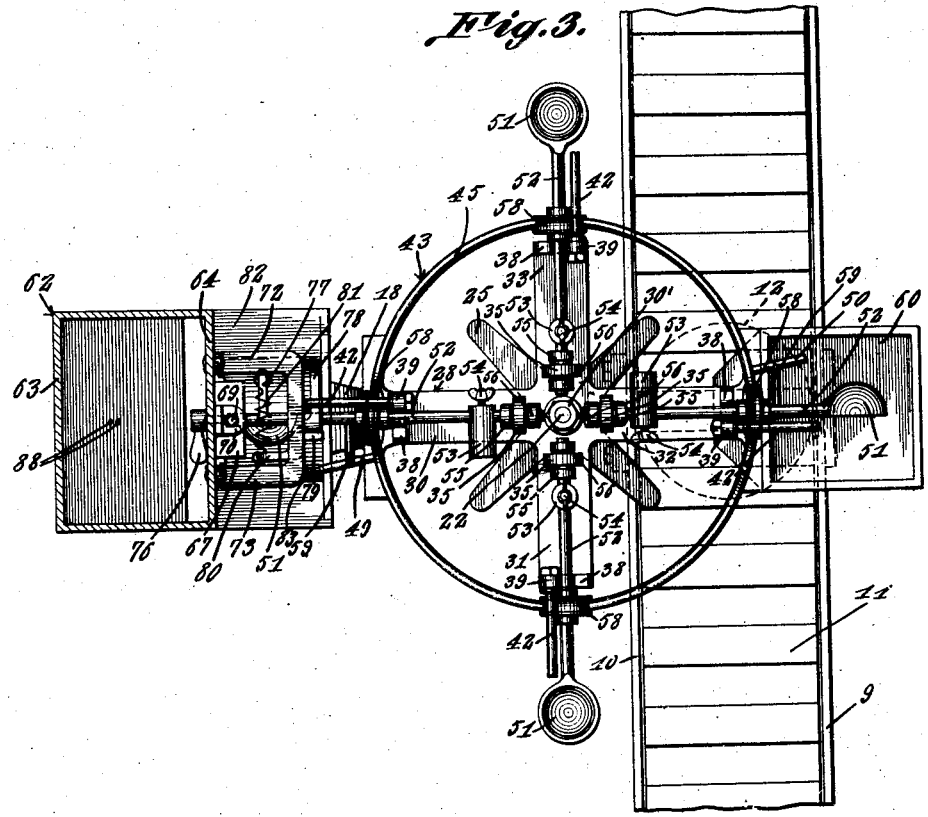
Figure 3 is a section on line 3—3 Figure 2.
Figure 4:
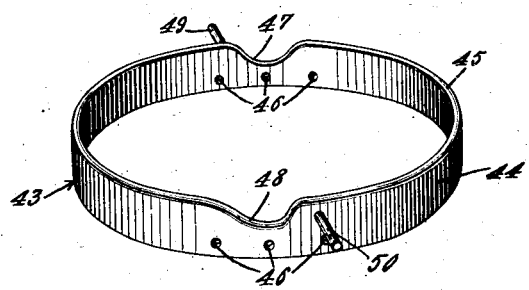
Figure 4 is a perspective view of the combined guide and trip element.

The shape of the depressed portion 47 of the element 43 is such as to provide for a cup 51 to travel through the concavity 83 in a dipping manner or in an arc of a circle so that the cup 51 will take up a quantity of salt from the concavity 83 and the cup 51 when full or when leaving the concavity 83 will assume the position shown in Figure 3. The shape of the depression 48 is such as to turn the cups 51 of the dipper for the purpose of dumping the salt therefrom and after the dumping action the dipper will assume the position shown in Figure 3. That is to say that cups 51 for the major portion of their travel will be disposed upwardly but when the dippers travel through the depressions 47 and 48 they will be turned to successively take up a quantity of salt and dump the same. The element 43, in connection with the pins 49 and 50 provide for the salt take-up action and the salt dumping action. The pin 59 of the dipper will abut against the pin 49 of the element 43 and which will provide for the turning of the dipper to salt receiving position and said pin 49 will retain the dipper in salt receiving position until the pin 59 clears the pin 49. The pin 50 acts to engage the pin 59 of the dipper for the purpose of turning the dipper and the dipper will be turned for the purpose of dumping the salt and held in salt dumping position until the pin 59 clears the pin 50. The travelling of the pulley 48 of a dipper, through the depressions 47 and 48 act in conjunction with the pins 49 and 50 to provide for the salt take-up action and dumping action of the dippers. The trip rods 42 which are connected with the carrier 28 provides means for intermittently actuating the shaft 75 against the action of its controlling spring and the said trip rods or bars 42 will engage the crank arm 78 and rock the shaft 35 causing thereby the shifting of the agitator 76 in one direction and the movement of the agitator in its opposite direction will be had by the controlling spring 81 when the trip rods or bars 42 clear the crank arm 78.

It is thought that the many advantages of a dispensing apparatus, in accordance with this invention for the purpose referred to can be readily understood, and although the preferred embodiment of the invention is as illustrated and described, yet it is to be understood that changes in the details of construction can be had which will fall within the scope of the invention as claimed.

What I claim is:

1. A dispensing apparatus comprising a horizontally disposed intermittently operable, revoluble carrier, a combined guide and trip element, a plurality of spaced radially disposed dispensers shiftably connected with and bodily movable with the carrier and travelling on said element, and said element and dispensers having co-acting means acting during the travel of the dispensers for turning each dispenser successively in opposite directions, at spaced intervals, on its longitudinal axis to alternately position it in dipping and dumping position to provide for a successive material take-up and material dumping actions therefor.

2. A dispensing apparatus comprising an intermittently operated carrier, a combined guide and trip element, a plurality of spaced, radially disposed dispensers shiftably connected with and bodily movable with the carrier and travelling on said element, said element and dispensers having co-acting means acting during the travel of the dispensers for turning each dispenser successively in opposite directions, at spaced intervals, on its longitudinal axis to alternately position it in dipping and dumping positions to provide for a successive material take-up and material dumping action therefor, means for supporting a supply of material and for delivering the latter in the path of the dispensers, agitating means for the material to cause free delivery thereof, and said carrier provided with means for actuating said agitating means during the travel of the carrier.

3. A dispensing apparatus for supplying salt to successive cans transported by a conveyor comprising a horizontally disposed, intermittently operable, revoluble carrier, a combined guide and trip element, a plurality of radially disposed, shiftable dispensers connected to and bodily movable with said carrier and travelling on said element, said element and dispensers having coacting means acting during the travel of the dispensers for turning each dispenser successively in opposite directions, at spaced intervals, on its longitudinal axis to alternately shift it into dipping and dumping positions to provide for a successive salt take-up and salt dumping action therefor, and means connected with the carrier and actuated by the cans during the travel thereof to provide for the operation of the carrier.

4. A dispensing apparatus for supplying salt to successive cans transported by a conveyor comprising an intermittently operated carrier, a combined guide and trip element, a plurality of shiftable dispensers connected to and bodily movable with said carrier travelling on said element, said element and dispensers having coacting means acting during the travel of the dispensers for turning each dispenser in opposite directions at spaced intervals, on its longitudinal axis to alternately shift it into dipping and dumping positions to provide for a successive salt take-up and salt dumping action therefor, means connected with the carrier and actuated by the cans during the travel thereof to provide for the operation of the carrier, means for supporting a supply of salt and for delivering the latter in the path of the dispensers, agitating means for the salt to cause free delivery thereof, and means on the carrier for operating said actuating means.

5. A dispensing apparatus for the purpose set forth comprising a horizontally disposed revoluble carrier, a combined guide and trip element, a plurality of spaced radially disposed revoluble dispensers mounted on and bodily carried with said carrier and traveling on said element, and said element and dispensers having coacting means acting during the travel of the dispensers for turning each dispenser in opposite directions, at spaced intervals, on its longitudinal axis to alternately shift it into dipping and dumping positions to provide for a material take-up and material dumping action therefor.

6. A dispensing apparatus for the purpose set forth comprising a revoluble carrier, a combined guide and trip element, a plurality of revoluble dispensers mounted on and bodily carried with said carrier, said element and dispensers having coacting means acting during the travel of the dispensers for turning each dispenser successively in opposite directions, at spaced intervals, on its longitudinal axis to alternately shift it into dipping and dumping positions to provide for a successive material take-up and material dumping action therefor, means for supporting a supply of material in the path of the dispensers, spring controlled agitating means for the material, and said carrier provided with trip devices engageable with and providing for the operation of said agitating means.

7. A dispensing apparatus comprising a horizontally disposed, intermittently operable, revoluble carrier, a combined guide and trip element surrounding said carrier, a plurality of spaced radially disposed dispensers shiftably connected with and bodily movable with the carrier and travelling on said element, said element and dispensers having co-acting means acting during the travel of the dispensers for turning each dispenser successively in opposite directions, at spaced intervals, on its longitudinal axis to alternately shift it into dipping and dumping positions to provide for a successive material take-up and material dumping action therefor, and each of said dispensers including a counterweight provided thereon intermediate the ends thereof to restore the dispensers from dipping or dumping position.

8. A dispensing apparatus comprising an intermittently operated carrier, a combined guide and trip element, a plurality of dispensers shiftably connected with and bodily movable with the carrier and travelling on said element, said element and dispensers having co-acting means acting during the travel of the dispensers for turning each dispenser successively in opposite directions, at spaced intervals, on its longitudinal axis to alternately shift it into dipping and dumping positions to provide for a successive material take-up and material dumping action therefor, means for supporting a supply of material and for delivering the latter in the path of the dispensers, agitating means for the material to provide for free delivery thereof, said carrier provided with means for actuating said agitating means during the travel of the carrier, and each of said dispensers including a counterweight provided thereon intermediate the ends thereof to restore the dispenser from dipping and dumping positions.

9. A dispensing apparatus for supplying salt to successive cans transported by a conveyor comprising a horizontally disposed, intermittently operable, revoluble carrier, a combined guide and trip element surrounding said carrier and spaced therefrom, a plurality of shiftable spaced, radially disposed dispensers connected to and bodily movable with said carrier and travelling on said element, said element and dispensers having co-acting means acting during the travel of the dispensers for turning each dispenser successively in opposite directions, at spaced intervals, on its longitudinal axis to alternately shift it into dipping and dumping positions to provide for a successive salt take-up and salt dumping action therefor, means connected with the carrier and actuated by the cans during the travel thereof to provide for the operation of the carrier, and each of said dispensers including a counterweight provided thereon intermediate the ends thereof and acting to restore the dispenser from dipping and dumping positions.

10. A dispensing apparatus for supplying salt to successive cans transported by a conveyor comprising an intermittently operated carrier, a combined guide and trip element, a plurality of shiftable, spaced, radially disposed dispensers connected to and bodily movable with said carrier and travelling on said element, said element and dispensers having coacting means acting during the travel of the dispensers for turning each dispenser successively in opposite directions, at spaced intervals, on its longitudinal axis to alternately shift it into dipping and dumping positions to provide for a successive salt take-up and salt dumping action therefor, means connected with the carrier and actuated by the cans during the travel thereof to provide for the operation of the carrier, means for supporting a supply of salt and for delivering the latter in the path of the dispensers, agitating means for the salt to provide for free delivery thereof, means on the carrier for operating said actuating means, and each of said dispensers including a counterweight provided thereon intermediate the ends thereof and acting to restore the dispenser from dipping and dumping positions.

11. A dispensing apparatus for the purpose set forth comprising a horizontally disposed revoluble carrier, a combined guide and trip element surrounding and spaced from the carrier, a plurality of radially disposed, spaced revoluble dispensers mounted on and bodily carried with said carrier and traveling on said element, said element and dispensers having co-acting means acting during the travel of the dispensers for turning each dispenser in opposite directions, at spaced intervals, on its longitudinal axis to alternately shift it into dipping and dumping positions to provide for an alternate material take-up and material dumping action thereof, and each of said dispensers including a counterweight provided thereon intermediate the ends thereof and acting to restore the dispenser from dipping and dumping positions.

12. A dispensing apparatus for the purpose set forth comprising a revoluble carrier, a combined guide and trip element, a plurality of radially disposed revoluble dispensers mounted on and bodily carried with said carrier and traveling on said element, said element and dispensers having coacting means acting during the travel of the dispensers for turning each dispenser successively in opposite directions, at spaced intervals, on its longitudinal axis to alternately shift it into dipping and dumping positions to provide for an alternate take-up and dumping action for each of said dispensers, means for supporting a supply of material and for delivering the latter in the path of the dispensers, spring controlled agitating means for the material to provide for the free delivery thereof, said carrier provided with trip devices engageable with and providing for the operation of said agitating means, and each of said dispensers including a counterweight provided thereon intermediate the ends thereof and acting to restore it from dipping and dumping positions.

13. A dispensing apparatus comprising a horizontally disposed, intermittently operable revoluble carrier, a combined guide and trip element and surrounding and spaced from the carrier, counter-balanced dispensers revolubly mounted on and bodily carried with said carrier, said dispensers being radially disposed and travelling on said element, said element and dispensers having co-acting means acting during the travel of the dispensers for turning each dispenser in opposite directions, at spaced intervals, against the action of its counterweight and on its longitudinal axis to alternately shift it into dipping and dumping positions to provide for an alternate material take-up and material dumping action for each dispenser against the action of its counter-balance.

14. A dispensing apparatus comprising an intermittently operated carrier, a combined guide and trip element, counter-balanced dispensers revolubly mounted on and bodily carried with said carrier and each normally maintained in material transporting position by its counterbalance, said dispensers travelling on said element and said element and dispensers having co-acting means acting during the travel of the dispensers for turning each dispenser successively in opposite directions, at spaced intervals, on its longitudinal axis to alternately shift it into dipping and dumping positions against the action of its counterbalance to provide for an alternate material take-up and material dumping action for each dispenser against the action of its counter-balance, means for supporting a supply of material and for delivering the latter in the path of the dispensers, agitating means for the material to provide for the free delivery of the latter, and said carrier including means to provide for the operation of said agitating means.

15. A dispensing apparatus for supplying salt successively to cans transported by a conveyor comprising an intermittently operated carrier, a combined guide and trip element, counter-balanced dispensers revolubly mounted on and bodily carried with said carrier and each normally maintained in salt transporting position by its counterbalance, said dispensers being radially disposed and travelling on said element, said element and dispensers having co-acting means acting during the travel of the dispensers for turning each dispenser successively in opposite directions at spaced intervals, on its longitudinal axis to alternately shift it into dipping and dumping positions to provide for an alternate material take-up and material dumping action for each dispenser during the travel of the carrier and against the action of its counterbalance, means for supporting a supply of salt and for delivering the latter in the path of the dispensers, and means connected with the carrier and actuated by the cans during the travel thereof to provide for the operation of the carrier.

In testimony whereof, I affix my signature hereto.

FRANK HUBER.